(No Model.) 3 Sheets—Sheet 1.
A. M. HUGILL, J. OVERTON & R. H. CATLEY.
EVAPORATING APPARATUS.
No. 585,819. Patented July 6, 1897.
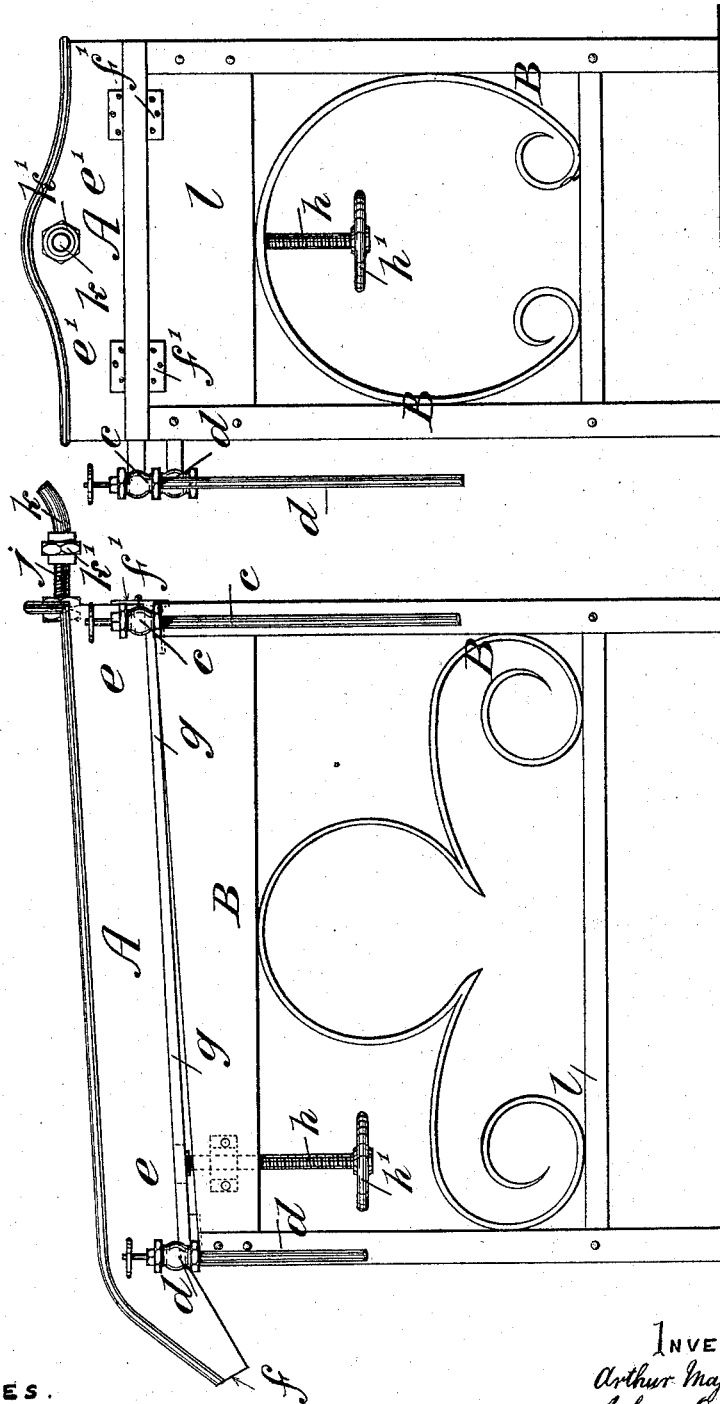
WITNESSES.
Otto Munk
H. VanDeemel
INVENTORS.
Arthur Major Hugill.
John Overton.
Robert Henry Catley.
By their attorney Richards (No Model.) 3 Sheets—Sheet 2.
A. M. HUGILL, J. OVERTON & R. H. CATLEY.
EVAPORATING APPARATUS.
No. 585,819. Patented July 6, 1897.
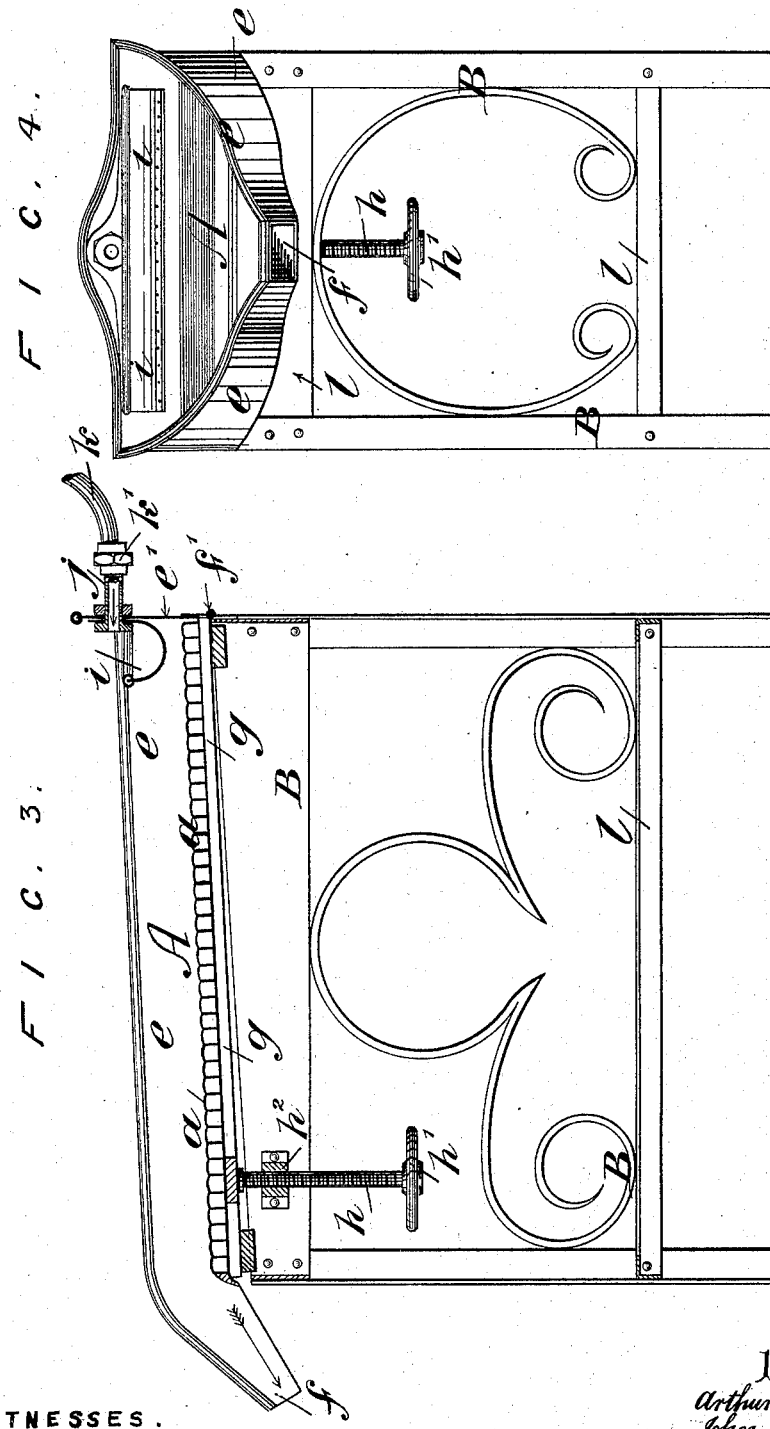
WITNESSES.
Otto Munk
H. van Devennee
INVENTORS.
Arthur Major Hugill.
John Overton.
Robert Henry Catley.
By their Attorney Richards (No Model.) 3 Sheets—Sheet 3.
A. M. HUGILL, J. OVERTON & R. H. CATLEY.
EVAPORATING APPARATUS.
No. 585,819. Patented July 6, 1897.
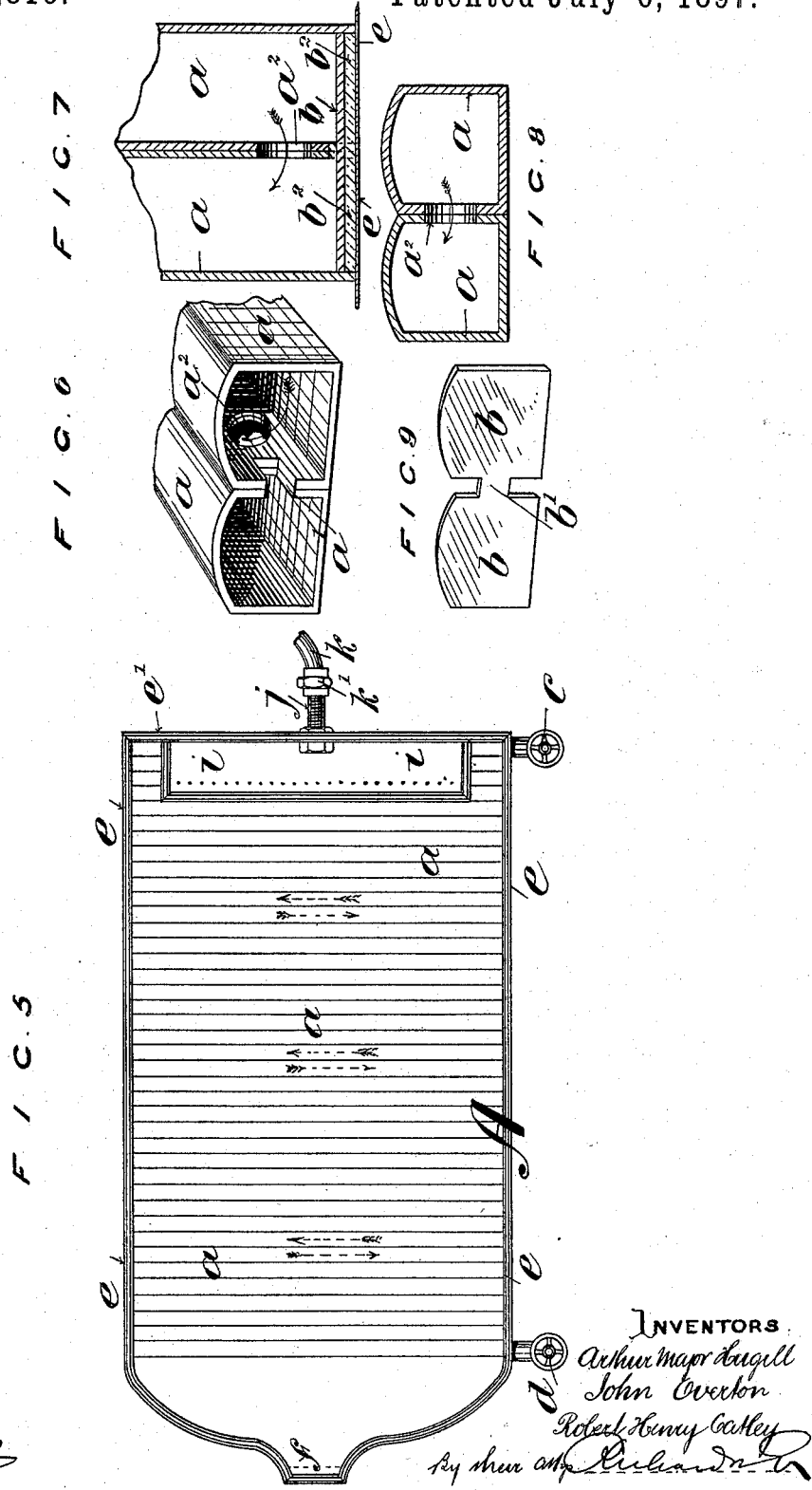

UNITED STATES PATENT OFFICE.

ARTHUR MAJOR HUGILL, JOHN OVERTON, AND ROBERT HENRY CATLEY, OF LIVERPOOL, ENGLAND.

EVAPORATING APPARATUS.

SPECIFICATION forming part of Letters Patent No. 585,819, dated July 6, 1897.

Application filed August 10, 1896. Serial No. 602,340. (No model.) Patented in England October 11, 1895, No. 19,103.

*To all whom it may concern:*

Be it known that we, ARTHUR MAJOR HUGILL, JOHN OVERTON, and ROBERT HENRY CATLEY, subjects of the Queen of Great Britain and Ireland, residing at Liverpool, in the county of Lancaster, England, have invented certain new and useful Improvements in Means or Apparatus for Heating, Evaporating, and Concentrating Infusions and Liquids, (for which we have received Letters Patent in Great Britain, No. 19,103, dated October 11, 1895,) of which the following is a description.

Our said invention relates to improved means or apparatus for heating, evaporating, and concentrating infusions and liquids.

In the treatment of certain chemicals and medicaments in a liquid form and also in the treatment and preparation of other liquids it is sometimes necessary to evaporate and concentrate the liquid or infusion so as to increase its strength or density. At present in the druggist's laboratory and in other work places such evaporation or concentration is carried on in pans heated from beneath. In such pans the evaporating and heating surfaces are necessarily limited in area, so that evaporation is slow, and unless agitation is freely resorted to the portion of liquid next to the interior of the pan is apt to remain in that position and deteriorate in quality, while the depth of liquid is an obstacle to the free escape of the steam-bubbles. In addition to this the pans are very apt to boil over and cause loss or create danger. By means of our invention we seek to obviate these disadvantages and perform the heating, evaporating, and concentrating processes in a much more economical, speedy, safe, and effective manner than heretofore.

Speaking broadly, the gist of our invention consists in the provision of a flat extended area or tray heated to the required extent and adapted to receive a thin stream or spray of the liquid to be concentrated. This thin stream of liquid is allowed to progress over the heated area to the delivery end or outlet, where the concentrated liquid is drawn off. The open and extended surface of the evaporating-tray provides to the fullest extent for free and rapid evaporation, and the constant progress of the liquid over the evaporating-surface prevents all standing or deterioration by prolonged contact with the heat. The stream of liquid is so shallow that not the slightest obstruction is offered to the free vent of the steam-bubbles, and the supply is also so manageable that no danger of boiling over is incurred. Such being the principle of our invention, we will now proceed to describe means for carrying the same into practical effect, the said means being illustrated in the accompanying three sheets of drawings.

On Sheet 1, Figure 1 is a side elevation of the evaporating apparatus. Fig. 2 is an end elevation at the feed end of the apparatus. On Sheet 2, Fig. 3 is a vertical longitudinal section. Fig. 4 is an end elevation at the delivery end. On Sheet 3, Fig. 5 is a plan view. Fig. 6 is a perspective view of the ends of two of the hollow tubes which compose the evaporating-surface of the tray. Fig. 7 is a horizontal section of these two tubes, showing the means for stopping or sealing the ends. Fig. 8 is a vertical section of the said tubes. Fig. 9 shows the stop-lock plates inserted into the sealed ends of the tubes.

According to the type of heater and evaporator chosen by us for illustration the apparatus consists of an evaporating-tray $A$, hinged to a stand B with an inclined top, the tray A being capable of adjustment to any desired angle, so as to incline the surface of the tray from the supply end downward toward the delivery end. The said evaporating-tray A consists, mainly, of the evaporating-surface $a$, which is composed of a number of hollow tubes $a$, of copper or other suitable metal, which are preferably of a square shape with hog-backed top, as most clearly shown in Figs. 6 and 8. These tubes $a$ are laid side by side, so as to constitute the floor or evaporating-surface of the tray.

To unite the tubes together pair by pair, we use solder and locking-plates $b$, (shown at Fig. 9,) the limb $b'$ between the two plates $b$ slipping into a slot $a'$, cut in the end of the tubes. When the double plate $b$ has been slipped into the end of the two adjacent tubes, we fill in a backing $b^2$, of solder or other suitable metal or material lying flush with the ends of the tubes. This makes a most effectual and secure seal for the tube ends. When the sealed pairs of tubes are all laid together, a backing of solder or sheet metal unites them into what is practically one homogeneous whole, forming the tray-floor or evaporating-surface a, as already set forth. As steam or other heating fluid is circulated through the said hollow tubes from end to end of the tray, we form holes a' on each alternate side at each alternate end of the tubes a, as appears, for example, in Figs. 6, 7, and 8, these holes allowing the steam to flow from one tube to another and thus circulate to and fro through the whole of the tubes composing the evaporating-surface.

It may here be noted that the steam is admitted to the circulating-tubing a through the valve c and leaves the tubing through the valve d. The evaporating-surface composed by the tubing a is furnished with sides e and an end e' to confine the liquids treated on the tray, the sides e contracting at the delivery-foot of the tray until only the comparatively narrow delivery passage or spout f is left, through which the concentrated liquid is run off.

The sides e cover over the solder-stopped ends of the tubes a, so that a neat finish is imparted to the sides of the tray, the ends of the tubes being invisible.

The tray may either be hinged direct to the stand B or, as in the example, it may rest upon a hinged flap g, which is hinged by hinges f' to the higher or feed end of the stand B, the said flap and tray being adjusted to any desired angle by a set-screw h, with hand-wheel h', the screw h passing through a nut $h^2$, carried by a fixed cross-stay, extending between the sides l of the stand A. At the higher end of the tray we place a distributing-trough i, secured to the end e' of the tray by a screwed hollow sleeve j and jam-nuts. A flexible pipe k is secured to the outer end of the hollow sleeve j by a check-nut k'. The flexible pipe k can be connected to and disconnected from any convenient source of supply.

The trough i is perforated along the foot, as shown in Figs. 4 and 5. The liquid to be concentrated is fed by the supply-pipe k into the trough i, whence it flows through the perforations in a series of thin streams upon the heated evaporating-surface a. Immediately upon touching the highly-heated surface a the liquid boils and evaporates quickly, at the same time flowing down the inclined tray-surface a toward the delivery-spout f, from which it is discharged in a concentrated condition.

The succession of ribs or ridges developed by the hog-backed tops of the tubes a retard the downward flow of the liquid and also present a considerably-extended heating-surface to the liquid. The rate of flow may be increased or diminished by lowering or raising the adjustable end of the tray.

The apparatus is very quickly brought into working order by simply turning on the steam, and when not required the steam can be as easily turned off. The evaporating-surface a is easily accessible and easily cleaned. The apparatus costs much less than the usual boiling-pans, occupies less space, and is greatly more effective and economical, owing to the large area of heating-surface and the easy regulation of the heat in the tubes by means of the valves c and d.

Although we have specially referred to the utility of our invention as applicable to the evaporation and concentration of druggists' infusions and the like, the apparatus may also be used in other arts and manufactures where speedy heating, evaporation, and concentration are required.

We claim—

1. In combination, the evaporating or concentrating tray, the floor of which is composed of straight D-shaped tubes with rounded backs, laid closely together so as to present a corrugated surface and communicating with each other at alternate ends, the said ends being closed by interlocking plates; substantially as described.

2. In combination, an evaporating-pan, the floor of which is composed of a number of straight D-shaped tubes with rounded backs, said tubes communicating with each other at alternate ends, the said ends being closed by interlocking plates, the pan being furnished with a liquid strainer and distributer at the feed end, and exit-orifice at the delivery end, and mounted and hinged to a stand, with means for adjusting the pan to a suitable angle; substantially as described.

3. A tray made up of a series of transverse tubes having notches at their ends, and locking-plates fitting in the ends of the tubes and notches to close the tubes and lock them together, substantially as described.

In witness whereof we have hereunto set our hands in presence of two witnesses.

ARTHUR MAJOR HUGILL.
JOHN OVERTON.
ROBERT HENRY CATLEY.

Witnesses:
H. G. KENYON,
HENRY KRÜGER.